June 24, 1924.  
A. E. SCHEIN  
SAFETY STOP FOR GYROSTABILIZERS  
Filed Nov. 5, 1920

Inventor  
ALEXANDER E. SCHEIN  
By his Attorney  
Herbert H. Thompson

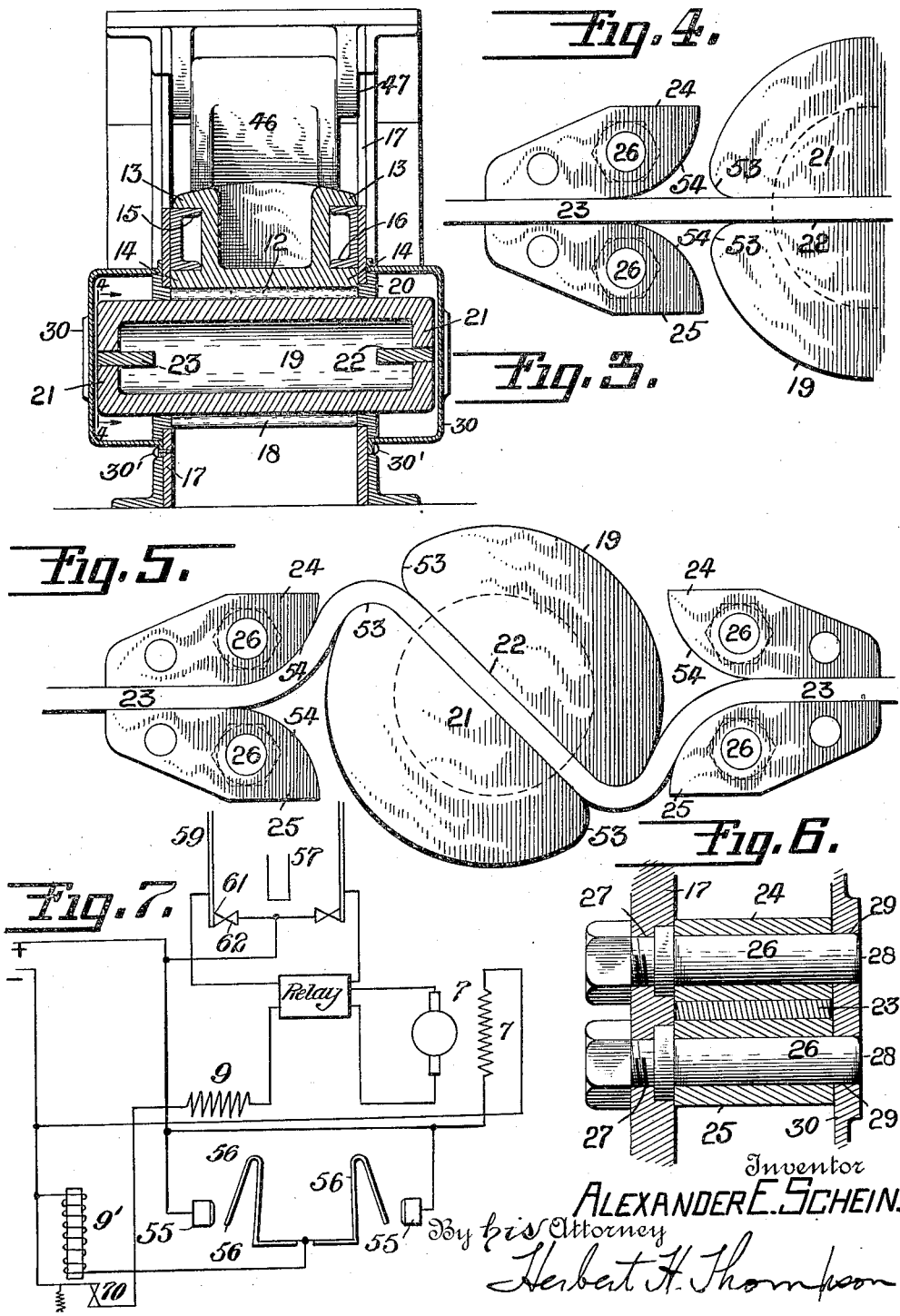

Patented June 24, 1924.

1,499,320

UNITED STATES PATENT OFFICE.

ALEXANDER E. SCHEIN, OF BROOKLYN, NEW YORK, ASSIGNOR TO THE SPERRY GYROSCOPE COMPANY, OF BROOKLYN, NEW YORK, A CORPORATION OF NEW YORK.

SAFETY STOP FOR GYROSTABILIZERS.

Application filed November 5, 1920. Serial No. 421,874.

*To all whom it may concern:*

Be it known that I, ALEXANDER E. SCHEIN, a citizen of the United States of America, residing at 476 Clinton Avenue, Brooklyn, New York, in the county of Kings and State of New York, have invented certain new and useful Improvements in Safety Stops for Gyrostabilizers, of which the following is a specification.

This invention relates to stabilizers for ships and more especially to means for braking the oscillatory or to and fro movements of the stabilizing member, and for locking the same against movement when the amplitude thereof exceeds a predetermined value. Such braking devices should be yielding in their action so as to give slightly while absorbing the force of the impact in order to avoid damage to the apparatus. While my invention has especial application to gyroscopic ship stabilizers, it also has application to other forms of devices for stabilizing or rolling ships in which it is necessary to set in motion and stop the stabilizing means as it moves back and forth during the ship's roll.

In my copending application Serial No. 403,181, for gyroscopic stabilizers for ships, filed August 12, 1920, I have shown means for stopping and locking the gyroscope against oscillation when the latter exceeds a predetermined degree. The stopping or braking means there shown comprises a heavy spring adapted to intercept the gyro in its excessive oscillatory movement and to absorb the energy exerted during such movement, the gyro being then locked against further movement if the movement against the spring exceeds a predetermined amount. In such a system, however, if the gyroscope is very large, a spring capable of absorbing the energy represented must be excessively large and would occupy a great deal of space. Moreover, the energy absorbed by the springs becomes stored therein and is necessarily transmitted to the gyroscope on its return oscillation, unless additional mechanism is employed to prevent this undesirable occurrence.

The principal object of the present invention is to overcome these objections to the spring braking device by the substitution of a simpler, smaller, and less expensive device in which the energy of the oscillating gyro is absorbed in doing work which is dissipated into heat such as in straining or otherwise changing the shape of a strip of iron or other metal.

Referring to the drawings wherein I have shown what I now consider to be the preferred form of my invention:

Fig. 3 is a section taken on line 3—3 of Fig. 2 omitting the gyro casing.

Fig. 4 is a fragmentary detail taken on line 4—4 of Fig. 3, showing the metallic strip to be bent.

Fig. 5 is a more complete view taken on the same line showing the strip partly bent.

Fig. 6 is a section taken on line 6—6 of Fig. 2.

Fig. 7 is a wiring diagram.

Figure 2:
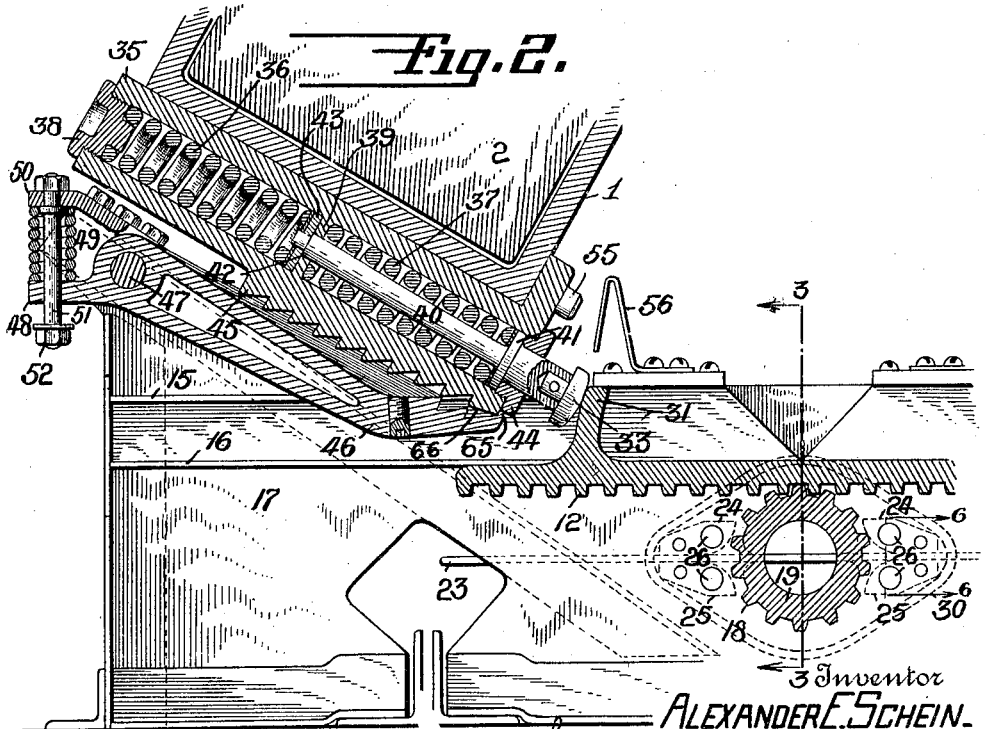
Fig. 2 is a sectional detail showing the gyroscope striking the stop or brake.

In the drawings which show my invention as applied to a gyroscopic stabilizer 1 represents the gyroscope casing, a portion of the gyro-rotor 2 being shown in Fig. 2. The casing is mounted in a frame 3 shown in dotted lines on an axis 4 about which it is adapted to oscillate. Secured to the casing is a gear 5 meshing with a chain of reduction gears 6 connected to a motor 7, so that operation of said motor under the control of a small control gyroscope as set forth in said aforementioned copending application will act to apply a force to the main gyroscope about axis 4. A braking device 8 more specifically described in said copending application may be provided for braking the precession motor 7. Said brake is adapted to be actuated by an electromagnet 9 acting upon an armature 10 connected through levers 11 to the braking device. The manner in which this motor brake is controlled will be more fully described hereinafter.

Figure 1:
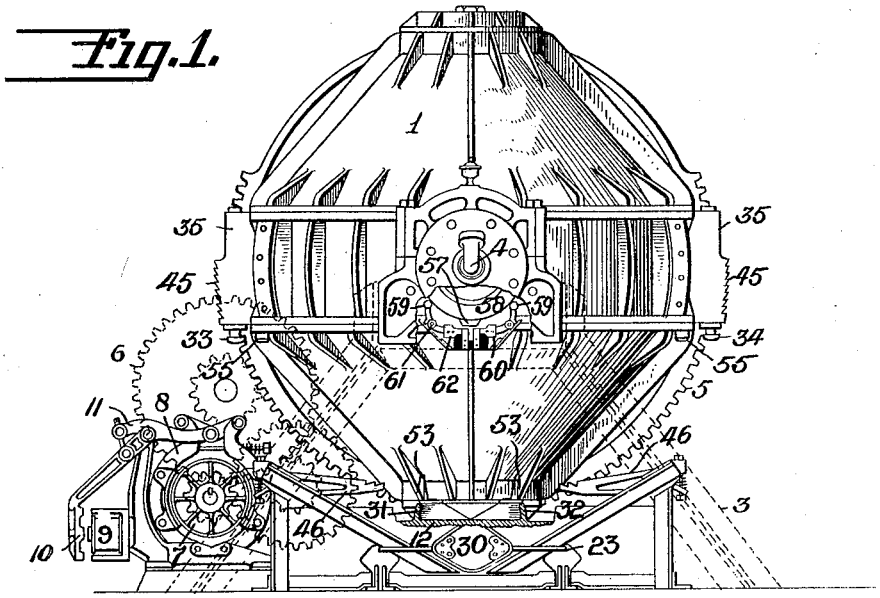
Fig. 1 is a side elevation of a gyroscopic stabilizer.

Below the gyroscope I have shown a rack 12 (see Figs. 1, 2, and 3) provided with side flanges 13, 14 engaging guide flanges 15, 16 secured to framework 17; the rack being thus slidable longitudinally. Said rack meshes with gear teeth 18 formed across the middle section of a drum 19 which is mounted for rotation in bearings 20 carried by the framework 17. The ends of the drum 19 may be closed as shown at 21 in order to strengthen the drum, and slits or grooves 22 are cut through the ends of the drum for the reception of strips of metal 23. On opposite sides of the drum adjacent the grooves 22 are provided members 24, 25 fixed with respect to the rotatable drum by being secured by heavy pins 26 securely anchored as shown at 27 to frame 17. The outer ends 28 of the pins are socketed in holes 29 in a cap member 30 fixed to frame 17 at 30′ for greater rigidity. The strip 23 passes between said members 24, 25.

The rack 12 is provided with shoulders 31, 32 so positioned as to be struck by bumpers 33, 34 on the gyroscope when the latter oscillates beyond the predetermined degree.

The preferred construction of the bumper is as follows: A member 35 having a cylindrical bore is secured to the gyro casing 1. One or more springs 36, 37 may be provided within the bore of said member. The rear end of spring 36 engages a plug 38 secured in member 35 and that of spring 37 a stop 39 integral with said member. The bumper element 33 which may be of hardened material is fixed to the end of a shaft 40 projecting into the bore of member 35. Said shaft is provided with a flange 41 engaging the forward end of spring 37, and a shoulder 42 engaging a movable plate 43 which in turn engages the forward end of spring 36. The shaft projects through a hole in stop 39 and also through end plug 44, which plug by engaging flange 41 holds the parts in position.

Members 35 may be provided with ratchet teeth 45, while frame 17 carries pawls 46 pivoted at 47 and having a shoulder 48. A spring 49 engaging shoulder 50 on frame 17 and shoulder 48 may serve to press the pawl into engagement with teeth 45. A bolt 51 having a nut 52 may serve to hold the spring 49 in place and to limit the play of the pawl.

The operation is as follows: Under normal sea conditions or when the forces tending to roll the ship are not excessive, the stabilizer will operate to prevent the rolling of the ship in the usual manner as explained in my aforesaid application, that is, the gyroscope, in precessing back and forth, has its precession limited by the striking of lug 57 against one or the other of limit switches 59, thereby opening the circuit of the precession motor (7), which also results in the application of the brake 8 by the deenergizing of the magnet 9. When the ship reverses its roll, the circuit is immediately completed through the other limit switch from the control gyro (not shown) by means of the usual relay to drive the precession motor 7 in the opposite direction. But when the sea becomes excessively rough so that the gyroscope oscillates through a dangerously wide angle about its axis 4 in damping out the roll, bumper 33 may strike shoulder 31 of rack 12 sliding said rack along guide rails 15, 16, thereby causing drum 19 to rotate in its bearings 20, tending to revolve the strips 23 around with it. The restriction of said strips between members 24, 25, however, (Fig. 4) prevents this, so that said strips are caused to bend as shown in Fig. 5 and wrap around drum 19. In other words, the plate is strained preferably beyond its elastic limit. As indicated, the corners 53, 54 of the drum and members 24, 25 over which the bending of the strips takes place are preferably rounded so that the bending upon the drum will not be too abrupt and so that the strips will draw properly through members 24, 25.

All of the energy represented in the oscillation of the gyroscope is absorbed in the work of bending or coiling strips 23, so that the oscillation is completely checked. In the meantime the pawl 46 will have engaged teeth 45, locking the gyroscope against further oscillation.

The initial shock of the impact between the bumper and rack will be absorbed by the springs 36, 37, thus avoiding breaking of the rack.

The strength of the springs 36, 37 is preferably such that they will yield to a degree permitting member 33 to strike the end plug 44 before strips 23 are caused to bend. Also contacts 55, 56 hereinafter referred to may be so positioned that they will not close, and pawl 46 so designed that it will not grip ratchet 45 until said springs have recoiled to substantially the aforesaid extent; the end 65 of the pawl being adapted to ride over the outstanding surface 66 the desired distance for this purpose, before meshing with the ratchet. Thus, if the force of the oscillation is such that the springs do not fully recoil no locking of the gyroscope and precession motor will take place, and the springs will act to limit the degree of oscillation while permitting the stabilizer to continue to operate. But when the springs are overcome by the force of precession the locking takes place as specified.

When the gyroscope strikes the rack with sufficient force to cause springs 36, 37 to yield and contact 55 to engage contact 56 closing the circuit through electromagnet 9′ (see Fig. 7) opening switch 70 and thereby causing the application of the brakes to the precession motor 7 and deenergizing the armature of the precession motor. Also before or, at the same time, a lug 57 carried by the trunnion 58 of the gyroscope is adapted to strike one or the other of the upper arms 59 of a switch 60. The switch blades are pivoted at 61 and engage contacts 62. The striking of arm 59 by lug 57 will open the switch and thus shut off the current from the precession motor 7 if the circuit is not broken at switch 70. The difference between the function of limit switches 61—62 and 55—56 is that the former breaks the circuit to one side of the line only leaving the motor free to be driven in the opposite direction when the ship reverses its roll. The latter on the other hand opens the main-line circuit so that the motor is deenergized and the brakes locked until reset by the operator. Thus it will be seen that at the same time the oscillation of the gyroscope is stopped, the current to the motor inducing or aiding the oscillation is shut off and a brake applied to quickly stop the motor.

Before the stabilizer is again placed in operation, the bent strips 23 will be taken out and new strips inserted.

As pointed out in the aforesaid copending application a small gyroscope is used to control the stabilizer through motor 7 which is geared to the stabilizer. In the event of failure of the control system by reason of breaking of the gear 5 or other connections, or the failure of current, etc., the stabilizer is apt to become erratic and to oscillate to an excessive degree. Under such conditions it will be readily recognized that the gyroscope will be stopped and locked against further operation, thus avoiding the danger of damage to the apparatus.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a ship stabilizer, a gyroscope mounted for oscillation about an axis, an element adapted to be brought into action by said gyroscope when the oscillation thereof exceeds a predetermined angle, a member associated with said element and adapted to be strained thereby when said element is brought into action, and means also brought into action under similar conditions for locking the gyroscope against further oscillation.

2. In a ship stabilizer, a gyroscope mounted for oscillation about an axis, a torque applying motor therefor, a brake, a metallic member adapted to be strained by said gyroscope when its oscillation exceeds a predetermined angle, means for locking the gyroscope against oscillation, and means for controlling said brake, both of said means being brought into action when the oscillation of the gyroscope exceeds said predetermined angle.

3. In a ship stabilizer, a gyroscope mounted for oscillation about an axis, an element adapted to be brought into action by said gyroscope when the oscillation thereof exceeds a predetermined angle, a member associated with said element and adapted to be strained thereby when said element is brought into action, and means for locking the gyroscope against further oscillation when said member is so strained.

4. In combination, a ship stabilizer, cushioned bumping means carried thereby, an element adapted to be struck and moved by said means, and a metallic member adapted to be strained beyond its elastic limit by said element in response to movement thereof.

5. A brake for a moving element comprising means adapted to be actuated by movement of such element and an elastic plate adapted to be strained by said means when so actuated beyond its elastic limit.

6. In combination, a gyroscopic stabilizer mounted for oscillation about an axis, a rack adapted to be actuated by said stabilizer when its oscillation exceeds a predetermined value, a rotatable element geared to said rack for actuation, a member connected with said element and adapted to be bent by rotation thereof.

7. In combination, a gyroscopic stabilizer for ships mounted for oscillation about an axis, means for braking the oscillation of said stabilizer comprising an element adapted to be brought into action by the stabilizer when its extent of oscillation exceeds a predetermined amount, and a member associated with said element and adapted to be permanently bent when said element is brought into action.

8. In a brake for a gyroscopic stabilizer, an element adapted to be struck by the stabilizer, a removable metallic member associated with said element and adapted to be deformed by movement of said element.

9. In combination, a gyroscopic stabilizer for ships mounted for oscillation about an axis, means for braking the oscillation of said stabilizer including an element adapted to be brought into action by the stabilizer when its extent of oscillation exceeds a predetermined amount, and a plate straining member actuated thereby.

10. In combination, a movable element, and braking means therefor comprising an elastic member adapted to be strained by movement of said element, said member being adapted to dissipate in heat the energy exerted in straining it.

11. In combination, a gyroscope mounted for oscillation about an axis, a member adjacent said gyroscope and adapted to be actuated thereby when the gyroscope oscillates in excess of a predetermined degree, and a removable plate carried by said member and adapted to be strained thereby when said member is so actuated.

12. In combination, a gyroscope mounted for oscillation about an axis, a member adjacent said gyroscope and adapted to be actuated thereby when the gyroscope oscillates in excess of a predetermined degree, a removable plate carried by said member and adapted to be strained thereby when said member is so actuated, and means for locking the gyroscope against return oscillation when said plate is so strained.

13. In combination, a gyroscope mounted for oscillation about an axis, a drum associated therewith and adapted to be rotated thereby when said oscillation exceeds a predetermined degree, and a removable member associated with said drum and adapted to be strained thereby when said drum is so rotated.

14. In combination, a gyroscope mounted for oscillation about an axis, a drum associated therewith and adapted to be rotated thereby when said oscillation exceeds a predetermined degree, a removable member associated with said drum, and adapted to be strained thereby when said drum is so rotated, and means for locking the gyroscope against return oscillation when said member is so strained.

15. In combination, a gyroscope mounted for oscillation about an axis, resilient means for limiting the degree of such oscillation, additional limiting means adapted to be brought into operation when the force of such oscillation exceeds a predetermined value, and means for locking the gyroscope against return oscillation when said additional limiting means is brought into operation.

16. In combination, a gyroscope mounted for oscillation about an axis, resilient means for limiting the degree of such oscillation, additional limiting means adapted to be brought into operation when the force of such oscillation exceeds a predetermined value, said last mentioned means comprising an elastic element adapted to be strained beyond its elastic limit by the gyroscope.

17. In combination, a gyroscope mounted for oscillation about an axis, a precession motor operatively connected with said gyroscope, resilient means for limiting the oscillation of the gyroscope, additional limiting means adapted to be brought into operation when the force of such oscillation exceeds a predetermined value, means for locking the gyroscope against return oscillation, and means for rendering said motor inoperative, both of said last mentioned means being brought into action when said additional limiting means is actuated.

18. In combination, a gyroscopic stabilizer for ships, braking means for said stabilizer including a member of predetermined shape, and means adapted to be actuated by said gyroscope for permanently changing the shape of said member.

19. In a ship stabilizing device, a member mounted for movement back and forth as the ship rolls, motive means for accelerating said member, braking means for the same, and a safety stop therefor including an elastic plate adapted to be strained by impact of said member beyond its elastic limit.

20. In a ship stabilizing device, a mass mounted for movement back and forth as the ship rolls, means for braking the same comprising an element adapted to be brought into action by said mass when its extent of to and fro motion exceeds a predetermined amount, and a member associated with said element and adapted to be permanently bent when said element is brought into action.

21. In a ship stabilizing device, a mass mounted for movement back and forth as the ship rolls, a member adjacent said mass and adapted to be actuated thereby when the mass moves back and forth in excess of a predetermined degree, and a removable plate carried by said member and adapted to be strained thereby when said member is so actuated.

22. In a ship stabilizing device, a mass mounted for movement back and forth as the ship rolls, resilient means for limiting the degree of such movement, additional limiting means adapted to be brought into operation when the force of such movement exceeds a predetermined value, and means for locking the mass against return movement when said additional limiting means is brought into operation.

In testimony whereof I have affixed my signature.

ALEXANDER E. SCHEIN.